United States Patent [19]

Matsuyama

[11] Patent Number: 4,933,701
[45] Date of Patent: Jun. 12, 1990

[54] CAMERA AND LENS SYSTEM CAPABLE OF AUTOMATIC FOCUSING AND MANUAL FOCUSING

[75] Inventor: Shinichi Matsuyama, Tokyo, Japan

[73] Assignee: Canon Kabushiki Kaisha, Tokyo, Japan

[21] Appl. No.: 253,037

[22] Filed: Oct. 4, 1988

[30] Foreign Application Priority Data

Oct. 22, 1987 [JP] Japan .................................. 62-266910

[51] Int. Cl.⁵ ............................................. G03B 3/00
[52] U.S. Cl. ................................... 354/400; 354/195.1
[58] Field of Search ............. 354/400, 402, 409, 195.1

[56] References Cited

U.S. PATENT DOCUMENTS

| | | |
|---|---|---|
| 4,527,879 | 7/1985 | Hosoe et al. ........................ 354/195.1 |
| 4,572,643 | 2/1986 | Akashi ............................... 354/195.1 |
| 4,681,419 | 7/1977 | Sakai et al. . |
| 4,687,915 | 8/1987 | Sakai et al. . |
| 4,740,076 | 4/1988 | Veda et al. ........................ 354/195.1 |
| 4,757,340 | 7/1988 | Tsukamoto ........................ 354/195.1 |
| 4,777,505 | 10/1988 | Hata et al. ........................ 354/195.1 |
| 4,780,738 | 10/1988 | Futahori et al. .................. 354/195.1 |
| 4,790,649 | 12/1988 | Harada et al. . |
| 4,845,521 | 7/1989 | Akashi . |

*Primary Examiner*—Russell E. Adams
*Attorney, Agent, or Firm*—Fitzpatrick, Cella, Harper & Scinto

[57] ABSTRACT

In a camera system capable of automatic focusing and manual focusing, a mode setting signal set by an automatic or manual focusing setting member provided in a lens device is transmitted to a camera and, depending on the mode setting signal, a manual focusing allowance signal is transmitted from the camera to the lens device, wherein the lens device comes into a manual focusing possible state in response to the manual focusing allowance signal from the camera.

12 Claims, 6 Drawing Sheets

CAMERA AND LENS SYSTEM CAPABLE OF AUTOMATIC FOCUSING AND MANUAL FOCUSING

BACKGROUND OF THE INVENTION

1. Field of the Invention

This invention relates to improvements in an interchangeable lens for a camera capable of selectively performing automatic focusing and motor-driven manual focusing.

2. Description of the Related Art

In the case of an interchangeable lens for a camera having drive means (such as a motor) for driving the focusing lens to thereby make it possible to selectively performing automatic focusing and motor-driven manual focusing (hereinafter referred to as "power" focusing), it has been the general rule that the power focusing is prohibited/allowed by the auto/manual changeover switch in such an arrangement as shown in FIG. 6.

In FIG. 6, 1 is a camera body; 2 is a camera side control circuit; 3 is a quick return half-mirror; 4 is a submirror; 5 is an AF sensor 5 comprised of a CCD, etc.; 6 is a signal line for the AF sensor drive signal; 7 is a signal line for the AF sensor output; 8 is a film plane; 9 is a pentagonal roof type prism. 10 is an interchangeable lens; 11 is a lens control circuit; 12 is a focusing lens; 13 is an electric motor which drives the focusing lens 12; 14 is a pulse disc which rotates as the focusing lens 12 moves; 15 is a constant current source; 16 is a light-emitting diode for projecting light to the pulse disc 14 to detect the amount of movement of the focusing lens 12; 17 is a phototransistor which receives the light reflected from the pulse disc 14; 18 is an auto/manual changeover switch which, when turned on, selects the power focusing (manual focusing) and when off selects the automatic focusing; 19 is a power focusing switch which when a forward-moving side contact point 19a turns on, selects forward movement of the focusing lens 12, and when a backward-moving side contact point 19b turns on, selects backward movement of the focusing lens 12; 20–22 are pull-up resistors; 23 is a communication line connecting the canera side control circuit 2 to the lens control circuit 11.

In such an arrangement as above, the lens control circuit 11 uses, as a forward-moving signal and a backward-moving signal, signals of low level due to the ON state of the forward-moving side contact 19a and the backward-moving side contact 19b of the power focusing switch 19. When either one of the inputs to a forward-moving terminal and a backward-moving terminal becomes low level, the lens control circuit 11 supplies electric power to the motor 13 to drive the focusing lens 12 in the corresponding direction. The forward-moving side contact 19a and the backward-moving side contact 19b of the power focusing switch 19 are normally made high level by the pull-up resistors 20 and 21. But, as the power focusing operation is carried out, when either one of the forward-moving side contact 19a and the backward-moving side contact 19b turns on, in other words, is connected to a movable contact 19c, the potential level at the contact connected to the movable contact 19c depends on the state of the auto/manual changeover switch 18. That is, when the auto/manual changeover switch 18 is off (automatic focusing), it becomes high level, and when on (manual focusing), it becomes low level.

Thereby, when the auto/manual changeover switch 18 is changed over to automatic focusing, the input signals to the forward-moving terminal and the backward-moving terminal of the lens control circuit 11 both maintain the high level state, not depending on the operated state of the power focusing switch 19. When the auto/manual changeover switch 18 is changed over to the manual focusing, the forward-moving side contact 19a or the backward-moving side contact 19b which is turned on by the operation of the power focusing switch 19 is connected to the ground through the movable contact 19c and the auto/manual changeover switch 18, becoming low level. Therefore, a forward-moving or backward-moving signal of low level enters the lens control circuit 11. Responsive to this, the motor 13 carries out forward or backward axial movement of the focusing lens 12.

In such a manner, the prohibition/allowance of the power focusing is changed over by the ON/OFF state of the auto/manual changeover switch 18 is provided in the interchangeable lens 10 without variation. Therefore, power focusing is determined irrespective of the camera body 1.

In the conventional example shown in FIG. 6, the auto/manual changeover corresponds to whether or not the power focusing is usable in one-to-one relation. This, if the ordinary camera is considered, seems to fulfill the necessity and sufficiency. Yet, when the automatic focusing is unable to detect the in-focus state, or its accuracy of focus detection is low, that is, in the case of the passive type automatic focusing, when an object to be photographed is in low illumination or of low contrast, or in the case of the active type automatic focusing when the reflectance of the object is very low, or the object distance is very long, it is desirable for the user to carry out focusing manually. For this situation, it is desirable that without having again to manipulate the auto/manual changeover switch, changing over to power focusing takes place automatically. Also, the person of high experience has a demand that after the in-focus state is obtained by automatic focusing, a sharper focus adjustment can be obtained manually. Even for this case, it is desirable that without manipulating the auto/manual changeover switch, automatic switching to power focusing occurs.

But, though this capability is very advantageous to the professional who thoroughly knows the camera, there is produced a possibility for the beginner who is not well accustomed with management of the camera to get all the worse for the faulty operation of the power focusing switch to spoil the effort to establish the in-focus.

Such problems are attributable to the fact that the selection of the prohibition and allowance of the power focusing relies only on the ON/OFF of the auto/manual changeover switch and is not controlled from the camera body.

SUMMARY OF THE INVENTION

One aspect of the present invention is to solve the above-described problems and to provide an interchangeable lens for a camera in which even when the auto/manual changeover switch is in the automatic focusing position, power focusing becomes possible, depending on some predetermined conditions, or some condition of the camera body. Also, even when the auto/manual changeover switch is in the manual focusing position, power focusing becomes impossible, depending on some predetermined conditions, or some condition of the camera body.

Another aspect of the present invention is to provide an interchangeable lens for a camera, or a camera system, wherein there are provided output means for transmitting the state of the auto/manual changeover switch to the camera body, input means for receiving a power focusing allowance signal and a power focusing prohibition signal from the camera body, and response means for making the power focusing operation possible or impossible by the power focusing allowance signal or the power focusing prohibition signal, whereby the power focusing allowance/prohibition is not determined on the lens side, but is determined by the power focusing allowance signal or the power focusing prohibition signal from the camera body.

Other aspects of the invention will become clearer from embodiments to be described with reference to drawings.

DETAILED DESCRIPTION OF THE PREFERRED EMBODIMENTS

Figure 1:
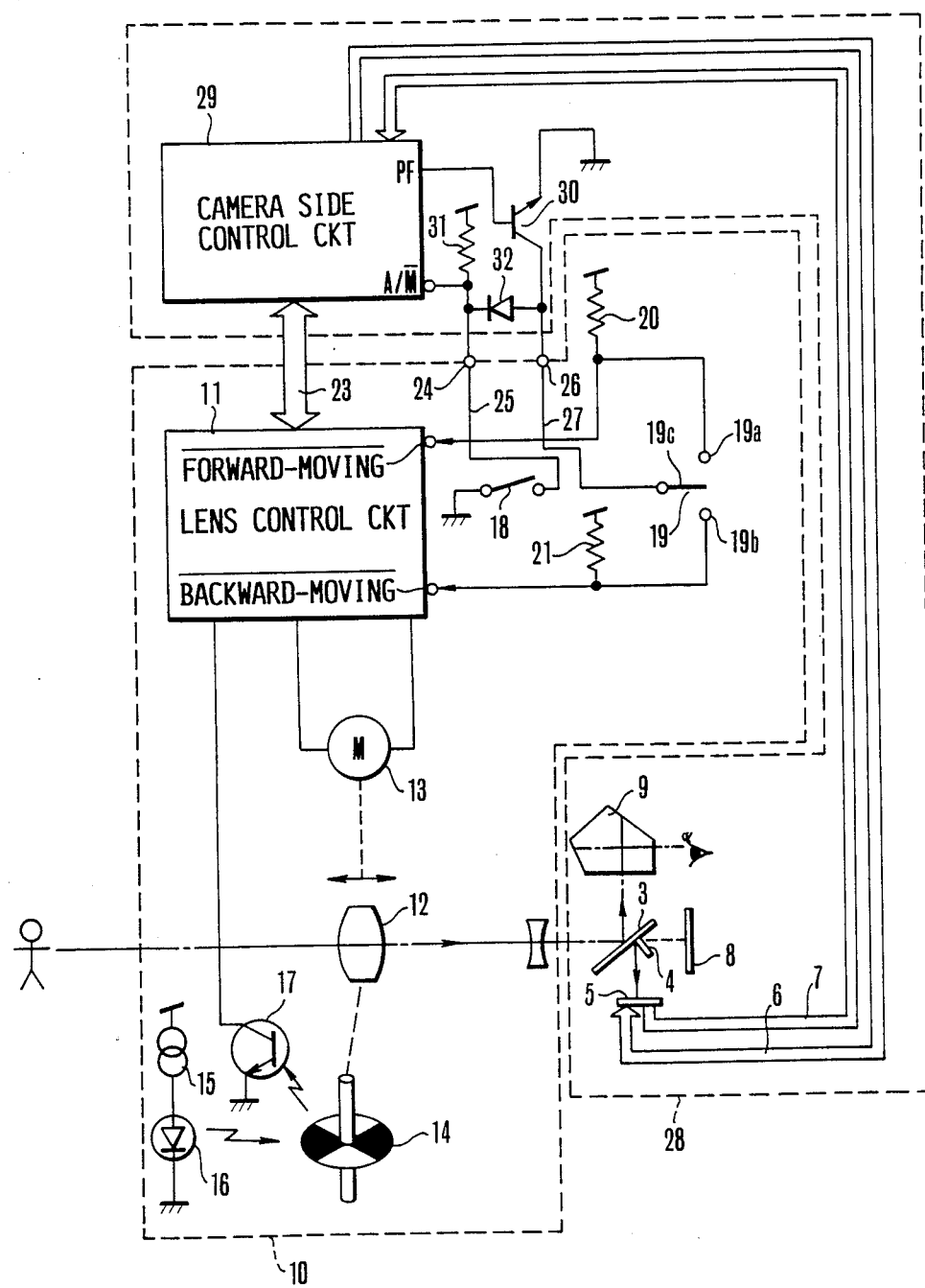
FIG. 1 is a block diagram illustrating an embodiment of the invention.
Figure 6:
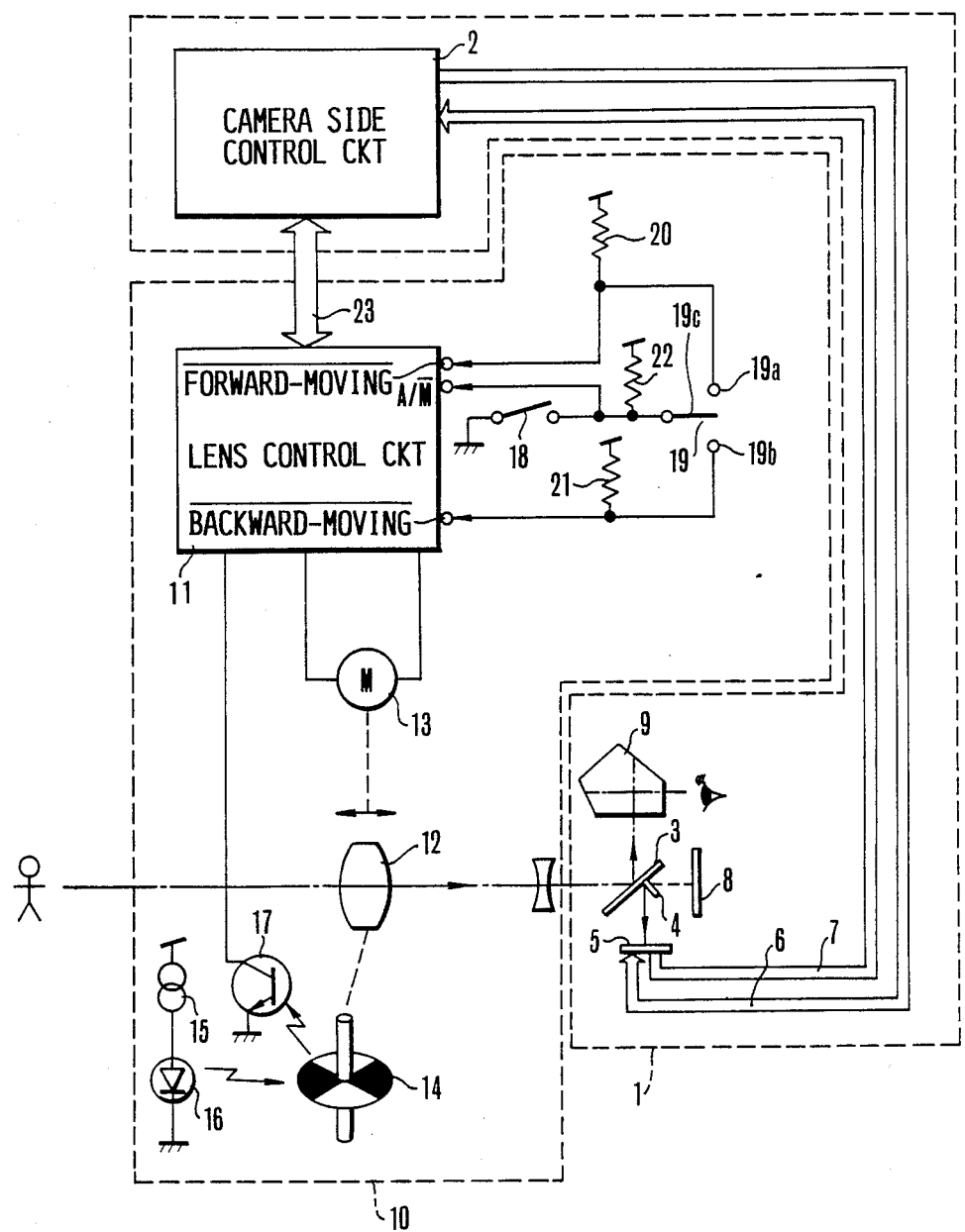
FIG. 6 is a block diagram illustrating a conventional example.

FIG. 1 illustrates one embodiment of the present invention. Parts similar to those shown in FIG. 6 are denoted by the same reference numerals.

10 is an interchangeable lens; 11 is a lens control circuit having a forward-moving terminal and a backward-moving terminal and may be included in microcomputer, etc.; 12 is a focusing lens; 13 is a motor for driving the focusing lens 12; 14 is a pulse disc whose rotation surface is painted in black and white sections and which rotates in accordance with the movement of the focusing lens 12; 15 is a constant current source; 16 is a light-emitting diode for projecting light to the pulse disc 14 to detect the amount of movement of the focusing lens 12; 17 is a phototransistor for receiving the light reflected from the pulse disc 14. The pulse disc 14, the light-emitting diode 16 and the phototransistor 17 constitute a pulse encoder. 18 is an auto/manual changeover switch whose ON (grounded state)/OFF (open state) is selectively set by the user, and which selects power focusing with ON and selects automatic focusing with OFF. 19 is a power focusing switch whose movable contact 19c is in the neutral position when the power focusing operation is not carried out, and which, when the forward-moving side contact 19a turns on in response to a forward-moving actuation, selects a forward axial movement of the focusing lens 12 and, when the backward-moving side contact 19b turns on in response to a backward-moving actuation, selects a backward axial movement of the focusing lens 12. 20 and 21 are pull-up resistors; 23 is a communication line; 24 is an auto/manual signal output terminal; 25 is a signal line; 26 is a power focusing prohibition/allowance signal input terminal; 27 is a signal line.

28 is a camera body adapted to the experienced person, in which even if the auto/manual changeover switch 18 is in the automatic focusing position, power focusing is possible. 29 is a camera side control circuit having an auto/manual terminal A/$\overline{M}$ and a power focusing allowance control terminal PF and which may be included in a microcomputer, etc.; 30 is a transistor for power focusing which, when on, generates a power focusing allowance signal, its base being connected to the power focusing allowance control terminal PF, and its collector being connected to the power focusing prohibition/allowance signal input terminal 26; 31 is a pull-up resistor whose one end is connected to the auto/manual terminal A/$\overline{M}$ of the camera side control circuit 29 and the auto/manual signal output terminal 24 of the interchangeable lens 10; 32 is a diode for, in the manual focusing position, unconditionally generating a power focusing allowance signal.

Figure 2:
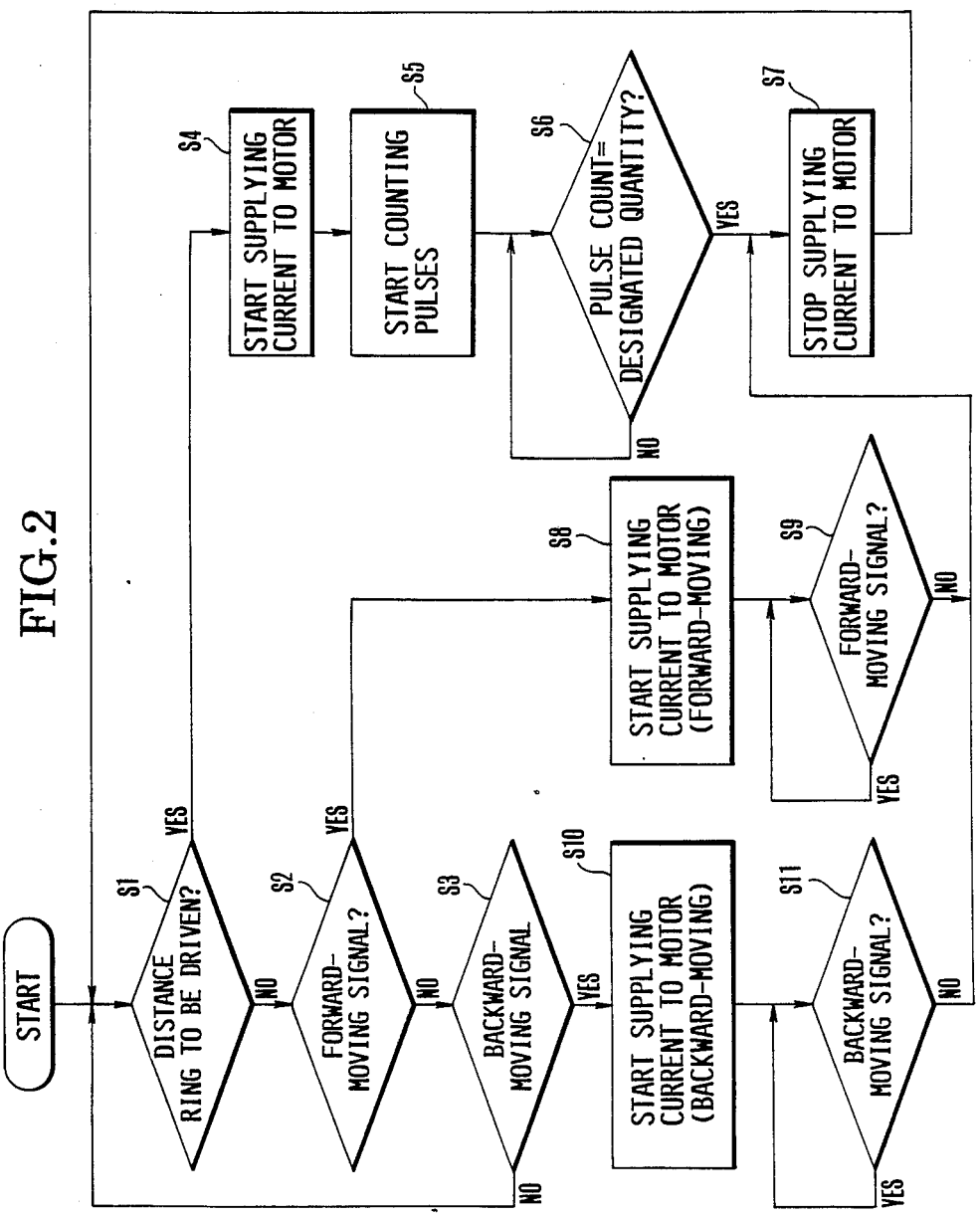
FIG. 2 is a flowchart illustrating the operation of the lens control circuit according to the FIG. 1 embodiment.

The operation of the lens control circuit 11 is next described by reference to the flowchart of FIG. 2.

Step S1: Judge whether or not a command for driving the focusing lens 12 is not commanded from the camera body 28 through the communication line 23. If not, then advance to a step S2. If it is provided then advance to a step S4.

Step S2: Judge whether the forward-moving signal of low level is input to the forward-moving terminal, that is, whether the power focusing allowance signal of low level is provided from the camera body 28 to the power focusing prohibition/allowance signal input terminal 26 and the forward-moving side terminal 19a of the power focusing switch 19 is on. If the forward-moving signal is inputted, then advance to a step S8. If it is not inputted, then advance to a step S3.

Step S3: Judge whether the backward-moving signal of low level is input to the backward-moving terminal, that is, whether the camera body 28 outputs the power focusing allowance signal of low level to the power focusing prohibition/allowance signal input terminal 26 and the backward-moving side contact 19b of the power focusing switch 19 is on. If the backward-moving signal is inputted, then advance to a step S10. If it is not inputted, then return to the step S1.

Step S4: Supply a current to the motor 13 according to the direction designated by the camera side control circuit 29, causing the focusing lens 12 to be driven.

Step S5: Start counting pulses produced from the phototransistor 17 as the focusing lens 12 moves. (This counting is performed by the computer in the control circuit 11.)

Step S6: Judge whether or not the counted number of pulses has reached a specificd quantity (drive amount) designated by the camera side control circuit 29. Until it is reached, the step S6 is repeated.

Step S7: Stop supplying a current to the motor 13, causing the focusing lens 12 to stop. Then return to the step S1.

Step S8: Start supplying a current to the motor 13 to drive the focusing lens 12 in the forward-moving direction.

Step S9: During the time when the forward-moving signal of low level is input, the step S9 is repeated. When the input signal inverts to high level, then advance to the step S7.

Step S10: Start supplying a current to the motor 13 to drive the focusing lens 12 in the backward-moving direction.

Step S11: During the time when the backward-moving signal of low level is input, the step S11 is repeated. When the input signal inverts to high level, then advance to the step S7.

Figure 3:
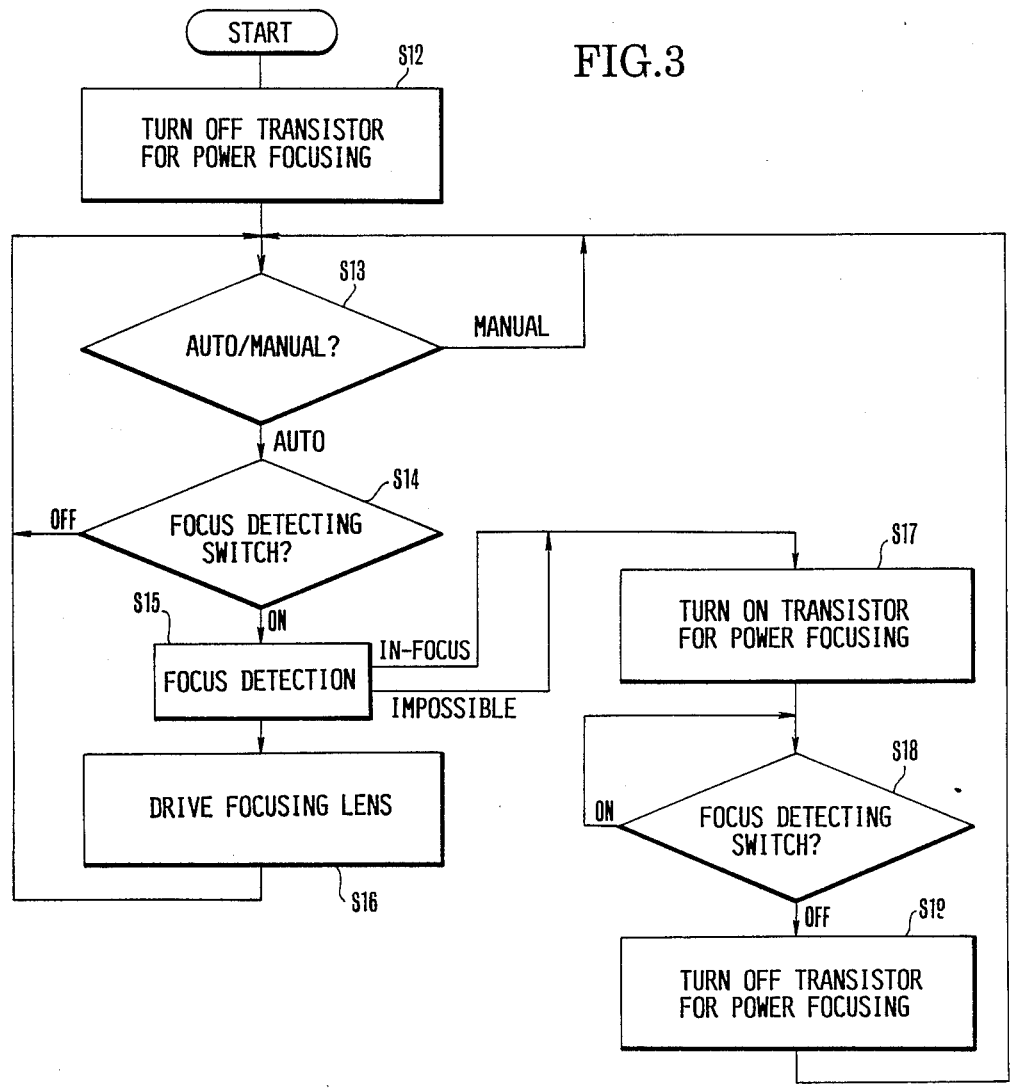
FIG. 3 is a flowchart illustrating the operation of the camera side control circuit shown in FIG. 1.

In a case where the interchangeable lens 10 is attached to the camera body 28, the camera side control circuit 29 operates as shown in the flowchart of FIG. 3. This flow is assumed to start when the electrical power source (not shown) of the camera is turned on.

Step 12: Initially set the power focusing transistor 30 to OFF.

Step S13: Judge whether the automatic focusing signal of high level or the manual focusing signal of low level is input to the auto/manual terminal A/$\overline{M}$. So long as the manual focusing signal is supplied, step S13 is repeated. When the automatic focusing signal is input, then advance to a step S14.

Step S14: Judge the state of a focus detecting switch (not shown) which is turned on by the first stroke of a release button (not shown). If off, then return to the step S13. If on, then advance to a step S15.

Step S15: Carry out focus detection and compute the defocus amount. If in focus, then advance to a step S17. Also, even in a case where the focus detection is impossible as the signal necessary to the focus detection is not obtained, an advance to the step S17 occurs. Otherwise, advance to a step S16. That is, in the step S15, the AF sensor 5 is driven and the output of the sensor 5 is input through the line 7 to carry out the defocus amount detection and low contrast detection. When the aforesaid defocus amount is below a predetermined value, it is judged to be in-focus. Then advance to the step S17. Also, when the contrast is low, the focus detection is judged to be impossible. At this time, an advance to the step S17 occurs.

Step 16: When, in the aforesaid step S15, a defocus amount (more than the predetermined value) is found, the drive direction, drive amount of the focusing lens 12 depending on the defocus amount computed in this step S16, and a drive command are supplied to the lens control circuit 11 through the communication line 23. Then return to the step S13.

By the above-described steps S13–S16, the communication between the camera and the lens in the automatic focusing operation is carried out. By the control circuit 11 in the lens 10, the above-described steps S1→S4→S5→S6→S7→S1 in the flow shown in FIG. 2 are executed. The lens driving in response to the computed defocus amount is repeatedly executed until the in-focus state is reached.

Meanwhile, when the above-described operation results in the in-focus state, or when the focus detection is impossible because the contrast is low, the flow advances to the step S17 where the following operation is carried out.

Step 17: Turn on the transistor 30 for power focusing, thereby causing the power focusing allowance signal of low level to be generated. This signal is transmitted to the power focusing prohibition/allowance signal input terminal 26 of the interchangeable lens 10 and changes the movable contact 19c of the power focusing switch 19 to low level. Thereby, either one of the forward-moving signal and the backward-moving signal (depending on the switched position of the power focusing switch 19) is supplied to the lens control circuit 11.

Thus, power focusing is carried out. That is, since, in the condition that the auto/manual changeover switch 18 is in the off (automatic focusing) position, the transistor 30 for power focusing is normally controlled to OFF, and power focusing is impossible. But, if the focus detection results in a judgment of in-focus or focus detection inability, power focusing is made possible. Therefore, after the in-focus state is obtained by the automatic focusing, the user, while not changing the auto/manual changeover switch 18 to the manual focusing made, can carry out sharper focusing with his own hand. Also, in the case of focus detection inability, without changing the auto/manual changeover switch 18 to the manual focusing made the user can manually seek the direction to the in-focus state.

In other words, the process has advanced to the step S17 and those that follow, and the step S16 is no longer executed. Therefore, the drive command to the lens side control circuit 11 is not provided. Hence the flow of FIG. 2 advances from the repetition of the steps S1→S4→S5→S6→S7 to the steps S1→S2→S3. Then depending on the switched position of the switch 19, either the steps S8→S9→S7 or the steps S10→S11→S7 are executed. Thus, by hand, focusing can be carried out. It should be noted that the drive instruction judgment in the step S1 is assumed to be canceled when the lens is driven after the instruction has been provided in the step S16. For this reason, after the lens has once been driven, whether or not a new drive instruction has been provided in the step S16 is judged in the step S1.

Step 18: During the time when the focus detecting switch is on, the step S18 is repeated.

Step 19: In response to the focus detecting switch turning off, turn off the power focusing transistor 30 to stop the generation of the power focusing allowance signal. Therefore, manual focusing in the direction designated by the switch 19 is carried out until the designation is interrupted by the switch 19 or the focus detecting switch turns off.

It should be noted in the step S13 that so long as the manual focusing signal of low level enters the auto/manual terminal A/$\overline{M}$, the camera body 28 does not perform the focus detecting operation at all, but because the manual focusing signal of low level pulls down the collector potential of the power focusing transistor 30 to low level through the diode 32, this potential of low level is transmitted as the power focusing allowance signal to the power focusing prohibition/allowance signal input terminal 26. Therefore, the movable contact 19c of the power focusing switch 19 becomes low level. In response to the changing over of the power focusing switch 19, either one of the forward-moving signal and the backward-moving signal is supplied to the lens control circuit 11, and power focusing is carried out.

Figure 4:
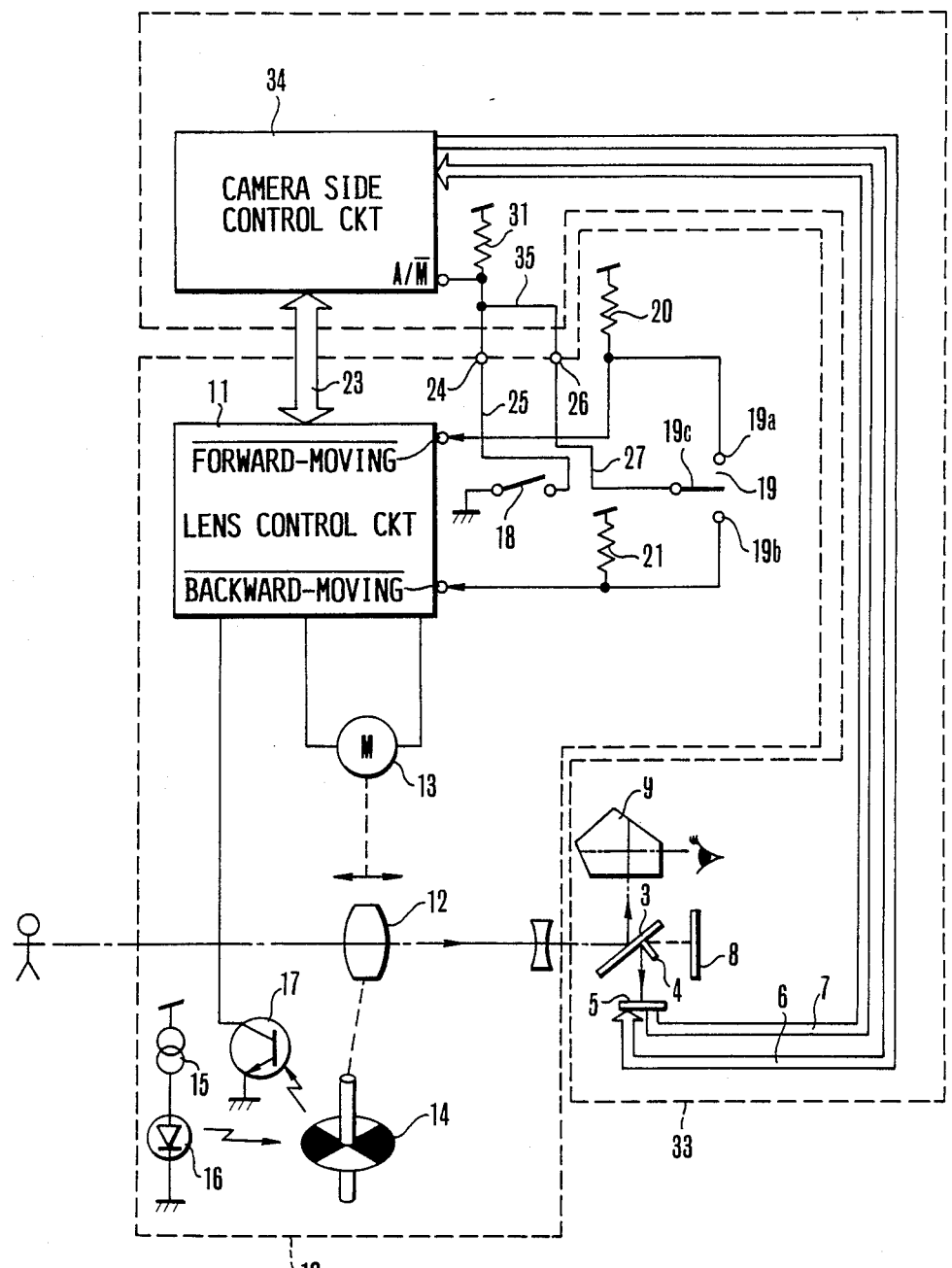
FIG. 4 is a block diagram illustrating an embodiment of the invention attached to a different camera body.

FIG. 4 illustrates the case wherein the interchangeable lens 10 is attached to another type of camera body 33. Parts similar to those of FIG. 1 are denoted by the same reference numerals.

Camera body 33 is one which is adapted to the beginner in that only when the auto/manual changeover switch 18 is in the manual focusing position, power focusing is made possible. 34 is a camera side control circuit having an auto/manual terminal A/$\overline{M}$; 35 is a signal line connecting the auto/manual signal output terminal 24 of the interchangeable lens 10 and the power focusing prohibition/allowance signal input terminal 26 within the camera body 33.

Figure 5:
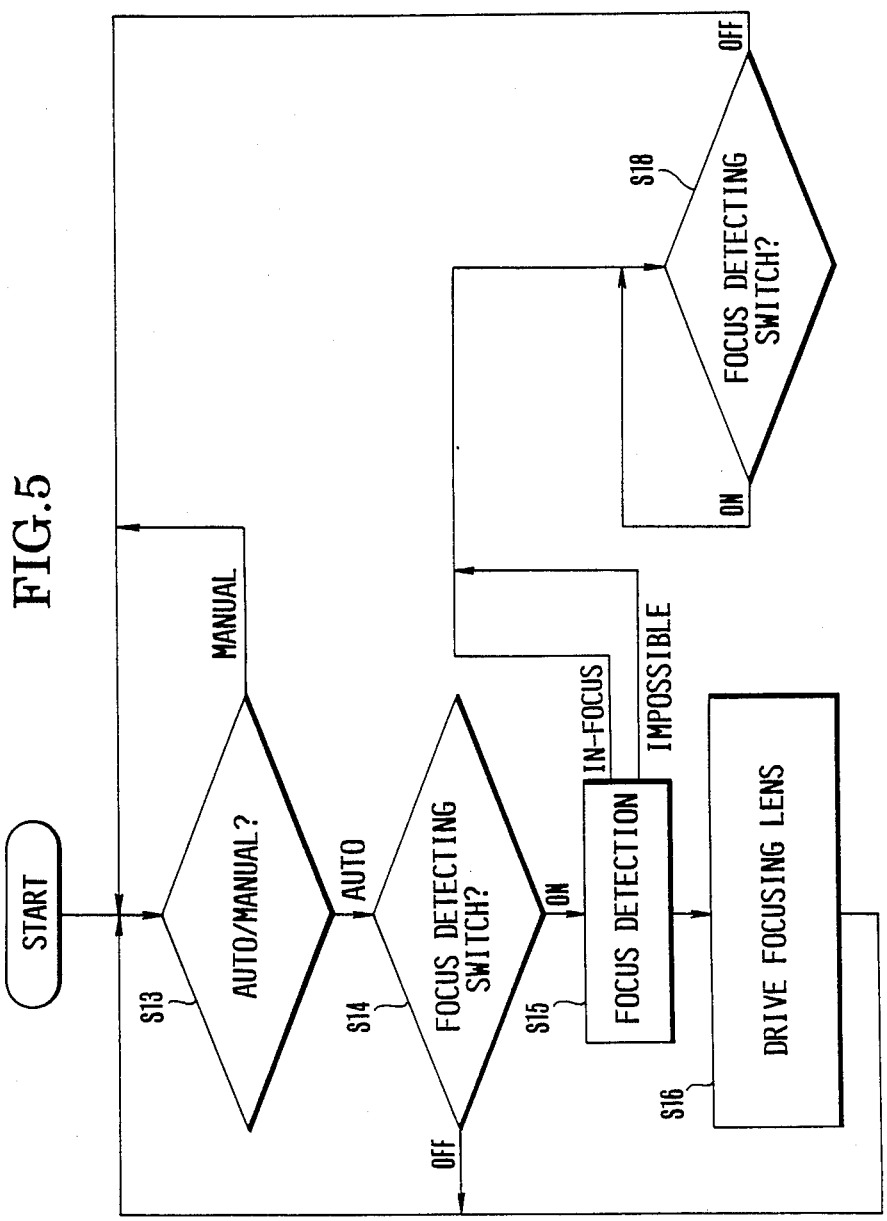
FIG. 5 is a flowchart illustrating the operation of the camera side control circuit shown in FIG. 4.

The camera side control circuit 34 operates according to the flowchart of FIG. 5. The operation in each step is similar to that in the same step of FIG. 3.

In the interchangeable lens 10, when the auto/manual changeover switch 18 is turned off (automatic focusing), an automatic focusing signal of high level is produced from the auto/manual signal output terminal 24. This signal passes through the signal line 35 of the camera body 33 and is input as the power focusing prohibition signal to the power focusing prohibition/allowance signal input terminal 26. Therefore, the potential of the movable contact 19c of the power focusing switch 19 is maintained at high level, so that even if the power focusing switch 19 is changed over, neither of the forward-moving signal and the backward-moving signal is generated. In short, it assumes a state where power focusing is impossible. When in this state, the focus detecting switch is turned on (step S14 in FIG. 5), and the camera side control circuit 34 of the camera body 33 carries out focus detection (Step S15), causing the focusing lens 12 to move a corresponding distance (step S16). Upon judgment of the in-focus state or a focus detecting inability, the state is maintained as it is until the focus detecting switch turns off (step S18). In this case, irrespective of the focus state, so long as the auto/manual changeover switch 18 is off (automatic focusing), power focusing cannot be carried out.

When the auto/manual changeover switch 18 is turned on (manual focusing), the manual focusing signal of low level is produced from the auto/manual signal output terminal 24. This signal passes through the signal line 35 of the camera body 33 and is input as the power focusing allowance signal to the power focusing prohibition/allowance signal input terminal 26. Therefore, the potential of the movable contact 19c of the power focusing switch 19 becomes low level, so that if the power focusing switch 19 is changed over, the forward-moving signal or the backward-moving signal of low level is generated. In response to this, the lens control circuit 11 carries out a power focusing operation.

It should be noted that though, in the illustrated embodiments, the auto/manual signal output terminal 24 and the power focusing prohibition/allowance signal input terminal 26 have been provided separately from the communication line 23, these may be omitted, and the auto/manual focusing signal and the power focusing prohibition/allowance signal can be transmitted by the communication line 23.

Also, though, in the illustrated embodiments, the generation of the forward-moving signal and the backward-moving signal are prohibited by the power focusing prohibition signal, the power focusing prohibition may be performed in any state from the generation of the forward-moving signal of power focusing and the backward-moving signal to the motor control, for example, by prohibiting reception of the forward-moving signal and the backward-moving signal of the lens control circuit 11, or by prohibiting control by the forward-moving signal and the backward-moving signal in the lens control circuit 11.

Further, though the illustrated embodiments are such that despite the automatic focusing state of the auto/manual changeover switch, power focusing is made possible by the automatic focusing allowance signal from the camera body, they may be such that even when the auto/manual changeover switch is in the manual focusing state, power focusing is made impossible by the power focusing prohibition signal from the camera body.

What is claimed is:

1. A camera system including a camera having a focus detecting device, and an interchangeable lens device attached to said camera, said interchangeable lens device being focused in response to a focusing state detected by said focus detecting device, comprising:
   (a) a setting member for selectively setting automatic focusing and manual focusing modes, said setting member being provided in said lens device;
   (b) a first transmitting circuit for transmitting a focusing mode setting signal produced by said setting member to said camera;
   (c) a signal forming circuit responsive to said focusing mode setting signal input through said first transmitting circuit for forming a manual focusing allowance signal or a manual focusing prohibition signal, said signal forming circuit being provided in said camera; and
   (d) a focusing circuit arranged in said lens device, said focusing circuit allowing a lens to be driven by a manual operation when said manual focusing allowance signal is formed by said signal forming circuit, and prohibiting the lens from being driven by a manual operation when said manual focusing prohibition signal is formed.

2. A camera system according to claim 1, further comprising:
   a second transmitting circuit for transmitting a signal from said signal forming circuit to said focusing circuit of said lens device.

3. A camera system according to claim 2, wherein said lens device is provided with a manual focusing operating member so that when said manual focusing allowance signal is formed, the lens is driven by said focusing circuit in response to an operation of said manual focusing operating member.

4. A camera system including a camera having a focus detecting device, and a lens device having a lens drive circuit receptive of a focusing state signal detected by said focus detecting device for driving a lens in accordance with said focusing state signal, comprising:
   (a) a setting member for selectively setting automatic focusing and manual focusing modes, said setting member being provided in said lens device;
   (b) a first transmitting circuit for transmitting a focusing mode setting signal produced by said setting member to said camera;
   (c) a manual focusing operating member provided in said lens device;
   (d) a signal forming circuit responsive to said focusing mode setting signal input through said first transmitting circuit for forming a manual focusing allowance signal, said signal forming circuit being provided in said camera;
   (e) a second transmitting circuit for transmitting a signal formed by said signal forming circuit to said lens device; and
   (f) said lens drive circuit, when the automatic focusing mode is set by said setting member, driving the lens in accordance with said focusing state signal, and driving the lens in response to said manual focusing allowance signal by an operation of said manual focusing operating member independently of said focusing state signal.

5. A camera system according to claim 4, wherein said signal forming circuit, when the automatic focusing mode is set, forms a manual focusing prohibition signal to prohibit a response of said lens drive circuit to the operation of said manual focusing operating member.

6. A camera system according to claim 5, wherein when said signal forming circuit produces said manual focusing allowance signal when in the automatic focusing mode, said focus detecting device is placed into a focus detection inability state.

7. A camera system including a camera having a focus detecting device, and a lens device having a lens drive circuit receptive of a focusing state signal detected by said focus detecting device for driving a lens in accordance with said focusing state signal, comprising:
 (a) a setting member for selectively setting automatic focusing and manual focusing modes, said setting member being provided in said lens device;
 (b) a transmitting circuit for transmitting a focusing mode setting signal produced by said setting member to said camera;
 (c) a manual focusing operating member provided in said lens device;
 (d) a signal forming circuit responsive to said focusing mode setting signal input through said transmitting circuit or a focus detected state by said focus detecting device for forming a manual focusing allowance signal; and
 (e) said lens drive circuit, in response to said manual focusing allowance signal, driving the lens by an operation of said manual focusing operating member independently of said focusing state signal.

8. A lens device to be attached to a camera having a focus detecting circuit for detecting a focusing state, a signal forming circuit responsive to a mode setting signal or a focus detection state detected by said focus detecting circuit for forming a manual focusing allowance signal, and a camera signal terminal portion receptive of said mode setting signal for outputting said manual focusing allowance signal and a focusing state signal produced by said focus detecting circuit, comprising:
 (a) a mode setting signal forming circuit for setting an automatic focusing mode or a manual focusing mode and forming said mode setting signal according to said set mode;
 (b) a manual focusing operating member;
 (c) a lens signal terminal portion to be connected to said camera signal terminal portion, said mode setting signal being transmitted through said lens signal terminal portion to said camera, and said manual focusing allowance signal and said focusing state signal being input to said lens device; and
 (d) a lens drive circuit for driving a lens by said focusing state signal and responsive to said manual focusing allowance signal for driving the lens in accordance with an operation of said manual focusing operating member independently of said focusing state signal.

9. A lens device according to claim 8, wherein said camera signal terminal portion and said lens signal terminal portion both include a terminal portion for said mode setting signal and a terminal portion for said manual focusing allowance signal.

10. A lens device according to claim 9, wherein said camera signal terminal portion and said lens signal terminal portion both include a terminal portion for said focusing state signal.

11. A camera system including a camera having a focus detecting device, and an interchangeable lens device attached to said camera, said interchangeable lens device being focused in response to a focusing state detected by said focus detecting device, comprising:
 (a) a setting member for selectively setting automatic focusing and manual focusing modes, said setting member being provided in said lens device;
 (b) a first transmitting circuit for transmitting a focusing mode setting signal produced by said setting member to said camera;
 (c) a signal forming circuit responsive to said focusing mode setting signal input through said first transmitting circuit for forming a manual focusing allowance signal, said signal forming circuit being provided in said camera; and
 (d) a focusing circuit allowing a lens to be moved by a manual operation when said manual focusing allowance signal is formed by said signal forming circuit.

12. A lens device to be attached to a camera having a focus detecting circuit for detecting a focusing state, a signal forming circuit responsive to a mode setting signal for forming a manual focusing allowance signal, and a camera signal terminal portion receptive of said mode setting signal for outputting said manual focusing allowance signal,
 (a) a mode setting signal forming circuit for setting an automatic focusing mode or a manual focusing mode and forming said mode setting signal according to said set mode;
 (b) a lens signal terminal portion to be connected to said camera signal terminal portion, said mode setting signal being transmitted through said lens signal terminal portion to said camera, and said manual focusing allowance signal being input to said lens device; and
 (c) a control circuit allowing a lens to be moved by a manual operation independently of said focusing state detected by said focus detecting circuit when said manual focusing allowance signal is formed by said signal forming circuit.

* * * * *

UNITED STATES PATENT AND TRADEMARK OFFICE
CERTIFICATE OF CORRECTION

PATENT NO. : 4,933,701
DATED : June 12, 1990
INVENTOR(S) : Shinichi MATSUYAMA

It is certified that error appears in the above-identified patent and that said Letters Patent is hereby corrected as shown below:

COLUMN 2:

Line 20, "is" should be deleted.

COLUMN 3:

Line 43, "in" should read --in a--.

COLUMN 6:

Line 11, "made," should read --mode,--; and

Line 14, "manual focusing made," should read manual focusing mode,--.

Signed and Sealed this

Seventh Day of July, 1992

Attest:

DOUGLAS B. COMER

*Attesting Officer*    *Acting Commissioner of Patents and Trademarks*